(12) United States Patent
Cunniff et al.

(10) Patent No.: US 7,898,549 B1
(45) Date of Patent: Mar. 1, 2011

(54) FASTER CLEARS FOR THREE-DIMENSIONAL MODELING APPLICATIONS

(75) Inventors: Ross A. Cunniff, Fort Collins, CO (US); Matthew J. Craighead, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 99 days.

(21) Appl. No.: 11/954,543

(22) Filed: Dec. 12, 2007

Related U.S. Application Data

(62) Division of application No. 10/641,279, filed on Aug. 13, 2003, now Pat. No. 7,528,839.

(51) Int. Cl.
*G09G 5/36* (2006.01)
*G06T 1/20* (2006.01)
*G06T 17/00* (2006.01)
*G06T 15/30* (2006.01)

(52) U.S. Cl. .......... 345/553; 345/420; 345/423; 345/506
(58) Field of Classification Search .................. 345/553, 345/420, 423, 506
See application file for complete search history.

(56) References Cited

U.S. PATENT DOCUMENTS

| 6,380,935 | B1* | 4/2002 | Heeschen et al. ............. 345/423 |
| 6,567,091 | B2 | 5/2003 | Dye et al. |
| 6,693,637 | B2 | 2/2004 | Koneru et al. |
| 6,864,895 | B1 | 3/2005 | Tidwell et al. |
| 7,050,069 | B2 | 5/2006 | Selig et al. |
| 2004/0100471 | A1 | 5/2004 | Leather et al. |
| 2004/0217966 | A1 | 11/2004 | Lefebvre et al. |
| 2004/0227772 | A1 | 11/2004 | Huang et al. |

* cited by examiner

*Primary Examiner* — Hau H Nguyen
(74) *Attorney, Agent, or Firm* — Townsend and Townsend and Crew LLP

(57) ABSTRACT

A graphics processing subsystem defines a bounding area as the portion of the display buffer and other memory buffers occupied by one or more rendered objects. When clearing the memory buffers, only the portions of the buffers corresponding to the bounding area need to be cleared. A graphics pipeline includes a bounding area memory to store bounding area values. The bounding area values are modified during rendering so that each rendered primitive falls within the bounding area values. The graphics processing subsystem clears a portion of the memory buffer in response to a clear command specifying a bounding area. The clear command may include a set of bounding area values defining the bounding area, or alternatively a reference to the bounding area memory. For applications that draw objects in isolation, the bounding area will be smaller than the window, resulting in a decreased time requirement for clearing the memory buffer.

18 Claims, 8 Drawing Sheets

FASTER CLEARS FOR THREE-DIMENSIONAL MODELING APPLICATIONS

This application is a divisional of U.S. patent application Ser. No. 10/641,279, filed Aug. 13, 2003, which disclosure is incorporated herein by reference for all purposes.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

During rendering, the graphics processing subsystem typically stores the rendered image in one or more memory buffers. The rendered image is then periodically read from memory buffer and output to a display device. To create animation, the graphics processing subsystem must generate a large number of successive images. The graphics processing subsystem typically creates each rendered image and stores the rendered image in a memory buffer just prior to its output to a display device. Before storing a rendered image in a memory buffer, the graphics processing subsystem must clear the data from any previously rendered images stored in the memory buffer.

Clearing memory buffers typically involves overwriting previous image data with a default value, such as a background color or a default depth, stencil, or alpha value. Previously, graphics processing subsystems would need to clear the entire memory buffer between successive images. As image resolutions, which increase the memory buffer size, and frame rates have increased, the time needed to clear the memory buffers has become a large factor in overall rendering performance. Further, many rendering applications, referred to as three-dimensional modeling applications, typically render one or more objects in isolation, leaving most of the image unchanged from its default values.

It is desirable for a graphics processing subsystem to decrease the amount of time spent clearing memory buffers by avoiding memory writes to portions of the memory buffers unchanged from their default values. It is further desirable that the improved graphics processing subsystem be adaptable to a variety of different rendering methods and to be compatible with existing rendering applications, graphics rendering APIs, and operating systems.

BRIEF SUMMARY OF THE INVENTION

An embodiment of the invention defines the bounding area as the portion of the display memory buffer and other memory buffers occupied by the rendered object or objects. When the memory buffers are to be cleared, only the portions of the memory buffers corresponding to the bounding area needs to be overwritten with default values. The memory buffer may be a display memory buffer, or a supplemental memory buffer, such as a depth buffer. The bounding area can be determined as geometric primitives are rasterized, or alternately from the transformed geometry prior to rasterization. In one implementation, a graphics processing subsystem determines the bounding area for a rendered image. A graphics driver then reads the bounding area from the graphics processing subsystem and instructs the graphics processing subsystem to clear the bounding area.

In an embodiment, a graphics processing subsystem includes a graphics pipeline adapted to process a rendering command defining a geometric primitive and a bounding area memory connected with the graphics pipeline and adapted to store a set of bounding area values defining a bounding area. The graphics pipeline is adapted to update the set of bounding area values stored in the bounding area memory so that the geometric primitive falls within the bounding area. In further embodiment, the graphics processing subsystem is further adapted to compare a bounding region associated with the geometric primitive with the set of bounding area values.

The graphics processing subsystem is further adapted to clear a portion of the memory buffer in response to a clear command specifying a bounding area associated with the memory buffer. In one embodiment, the clear command includes a set of bounding area values defining the bounding area. In an alternate embodiment, the clear command references the bounding area memory.

In another embodiment, the bounding area memory of the graphics processing subsystem includes a connection with a rasterizer stage of the graphics pipeline, such that the set of bounding area values are determined from a set of pixels output by the rasterizer stage. In an alternate embodiment, the bounding area memory of the graphics processing subsystem includes a connection with a raster operation stage of the graphics pipeline, such that the set of bounding area values are determined from a set of pixels output by the raster operation stage. In a further embodiment, the graphics processing subsystem is further adapted to modify the set of bounding area values in response to a line width value, and/or in response to a point size value.

In an additional embodiment, the graphics processing subsystem is adapted to reset the set of bounding area values stored in the bounding area memory in response to a reset command.

BRIEF DESCRIPTION OF THE DRAWINGS

The invention will be described with reference to the drawings, in which.

DETAILED DESCRIPTION OF THE INVENTION

Figure 1:
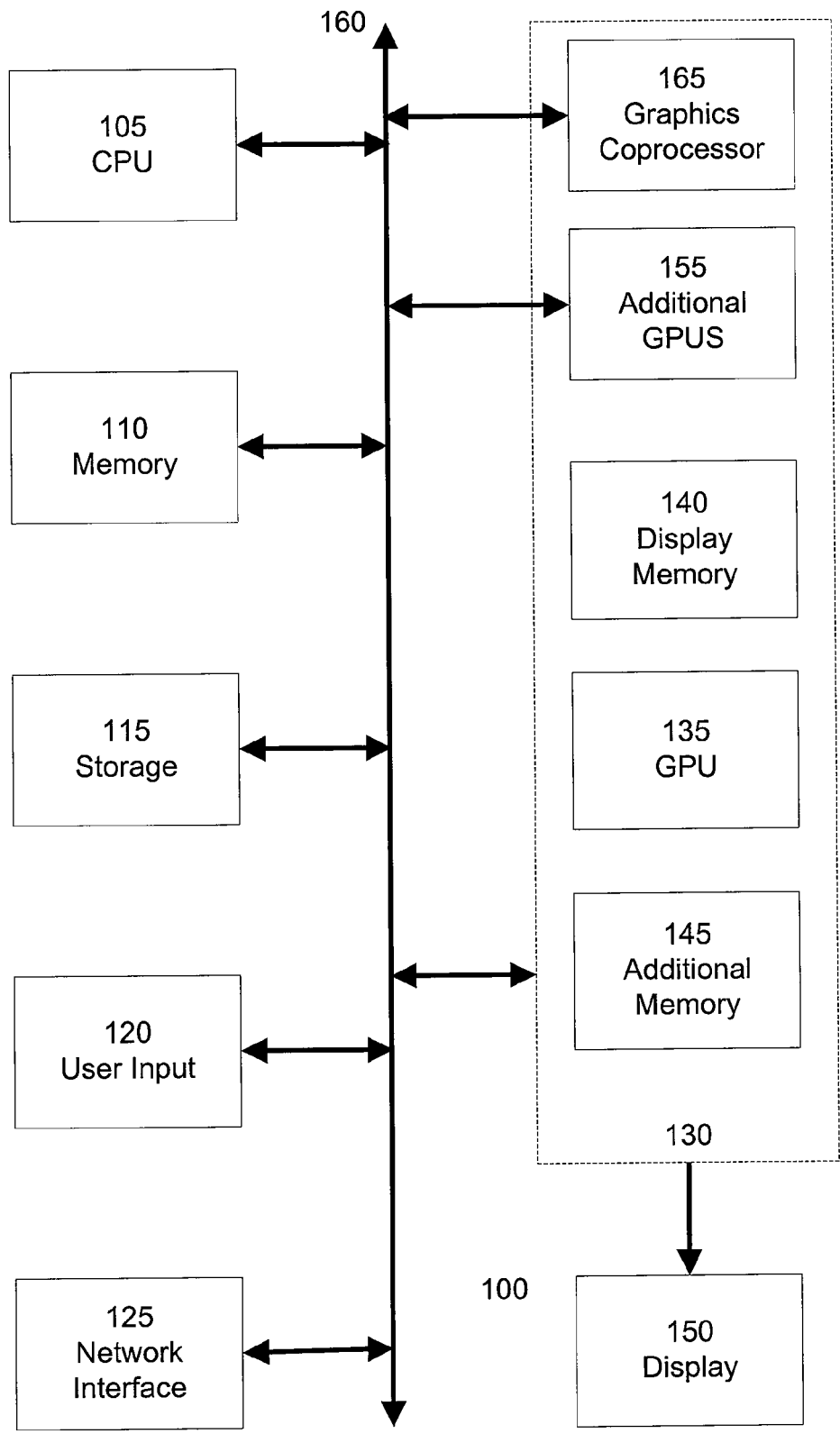
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/ or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X, and Hypertransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and additional GPUs 155.

Additional GPUs 150 can be located on the same circuit board as GPU 135 and sharing a connection with GPU 135 to data bus 160, or can be located on additional circuit boards separately connected with data bus 160. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge chip used to control the data bus 160.

Figure 2:
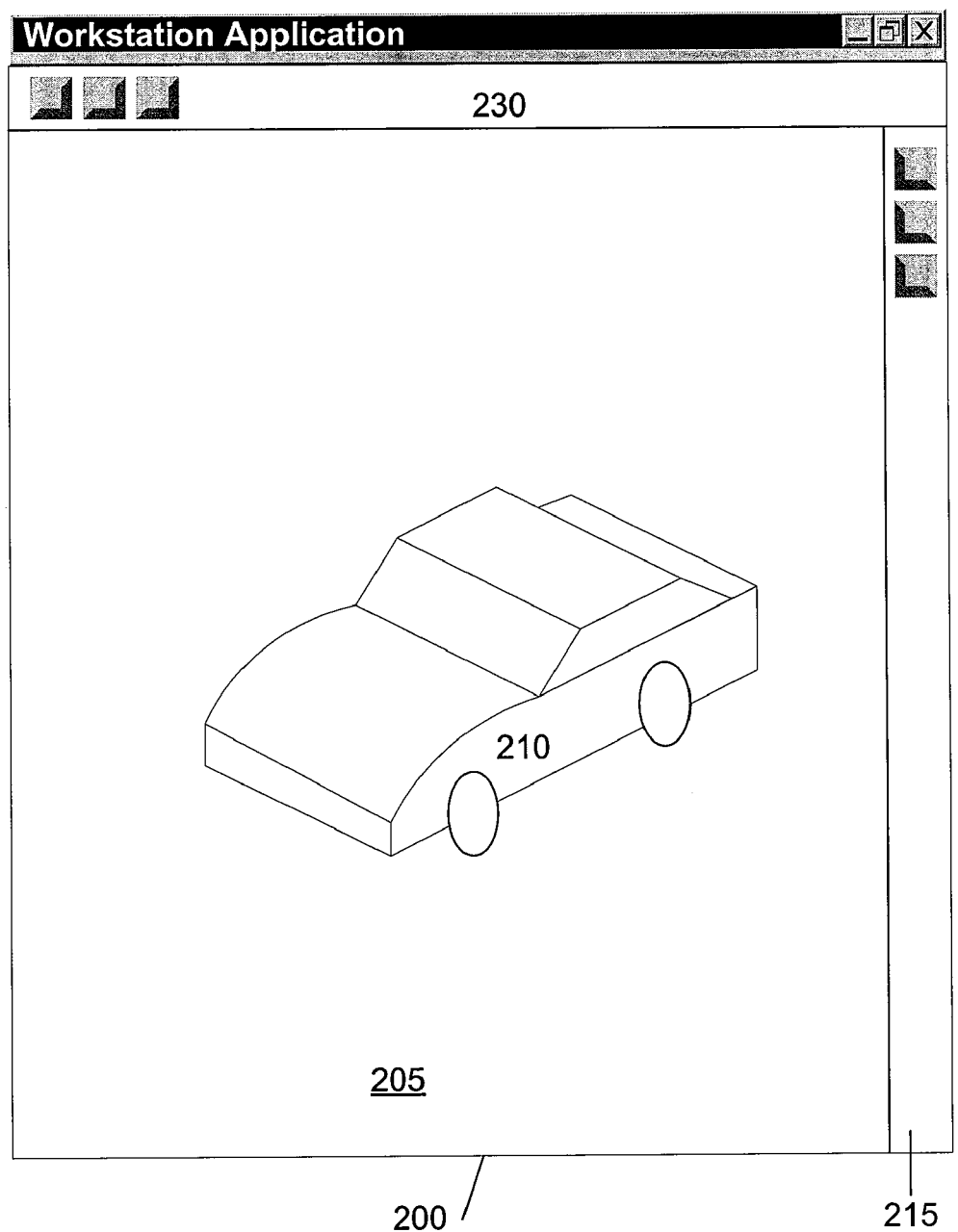
FIG. 2 is an example screen display of a three-dimensional modeling application suitable for practicing an embodiment of the invention.

FIG. 2 is an example screen display of a three-dimensional modeling application 200 suitable for practicing an embodiment of the invention. A three-dimensional modeling application is an application that typically renders one object or a set of closely-gathered objects. In a three-dimensional modeling application, the area around the object is typically left empty. This contrasts with applications like video games, which typically render a three-dimensional "scene" occupying the entire display. Examples of three-dimensional modeling applications include applications for designing and manipulating three-dimensional objects.

Three-dimensional modeling application 200 includes a display region 205 that displays a rendered image of object 210. As can be seen in the example of FIG. 2, the majority of the display region 205 is empty. Three-dimensional modeling application 200 includes graphical user interface elements, such as menu bar 220 and toolbar 215. The graphical user interface elements 215 and 220 allow users to control the three-dimensional modeling application 200. In an embodiment, the three-dimensional modeling application 200 uses a three-dimensional graphics application programming interface (API), such as OpenGL™ or DirectX™, to render object 210 in display region 205. The three-dimensional modeling application uses a two dimensional graphics API, such as GDI or Xlib, to render the graphical user interface elements 215 and 220.

Figure 3:
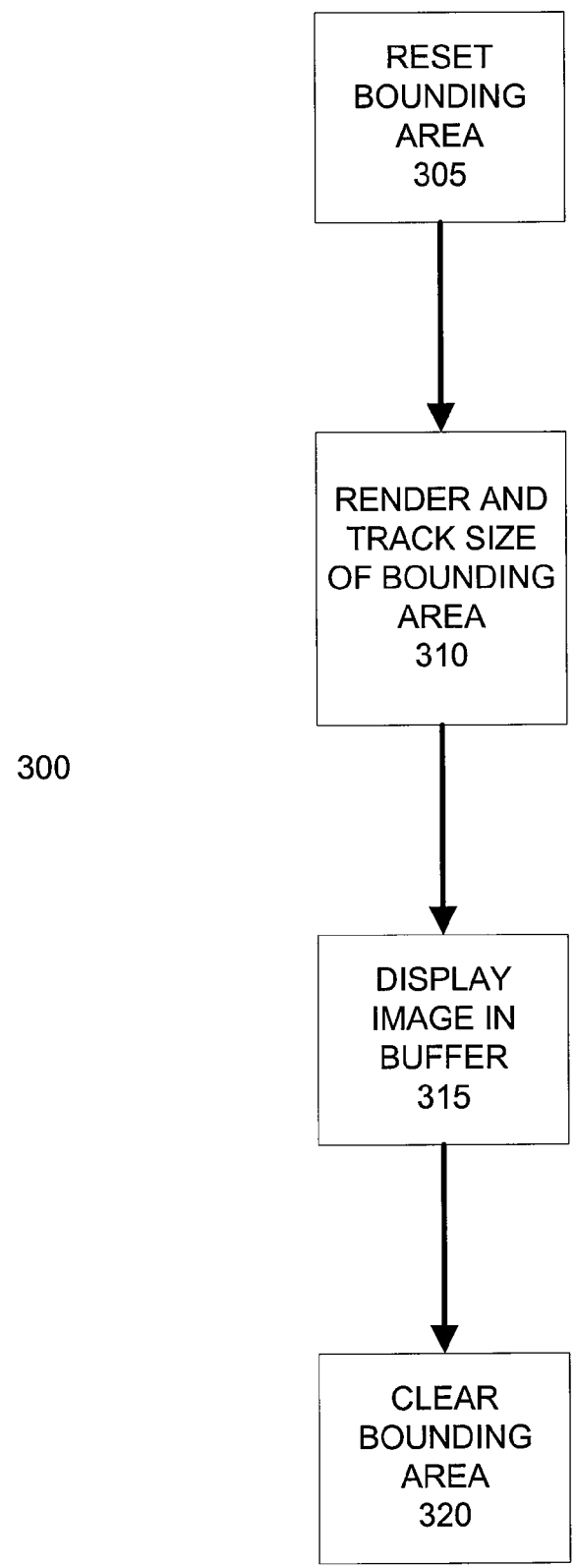
FIG. 3 illustrates a method for rendering an image according to an embodiment of the invention.

FIG. 3 illustrates a method 300 for rendering an image according to an embodiment of the invention. As discussed in more detail below, an embodiment of the invention defines the bounding area as the portion of the display memory buffer and other memory buffers occupied by the rendered object or objects. When the memory buffers are to be cleared, only the portions of the memory buffers corresponding to the bounding area needs to be overwritten with default values.

At step 305, a bounding area of the display region is reset to a zero or null value. In an embodiment of the invention, the bounding area is a rectangular region. In this embodiment, the location and size of the bounding area are defined by the location of opposite corners of the rectangular region, for example minimum and maximum x and y coordinates, or x and y coordinates of one corner and the x and y dimensions of the rectangular region. In a further embodiment, the bounding area includes multiple rectangular regions, each with a location and size defined as above.

At step 310, the graphics processing subsystem renders the object and tracks the size of the bounding area of the display region. In an embodiment, each geometric primitive, such as a triangle or quad, is associated with a bounding rectangle. As the geometric primitives are drawn by the graphics processing subsystem, the minimum and maximum extents of the bounding rectangle are compared with the bounding area of the display region. If the bounding rectangle of the primitive falls outside of the bounding area of the display region, the bounding area of the display region is expanded to include the bounding rectangle of the primitive. This comparison is repeated during the rendering of each geometric primitive. In an embodiment, a device driver used to interface the three-dimensional modeling application with the graphics processing subsystem is used to determine the bounding area of the display region. In an alternate embodiment, discussed in detail below, the bounding area is determined by the graphics processing subsystem.

In one implementation of step 310, the minimum extents of the bounding area of the display region are set to the minimum of the minimum x and y extents of the bounding rectangle and the previous minimum x and y extents of the bounding area of the display area. Similarly, the maximum extents of the bounding area of the display region are set to the maximum of the maximum x and y extents of the bounding rectangle and the previous maximum x and y extents of the bounding area of the display area.

In an alternate embodiment of step 310, the three-dimensional modeling application sends a display list, which is a static set of geometric primitives, to the graphics processing subsystem. In this embodiment, the bounding volume can be precomputed for the entire display list prior to rendering. In one implementation of this embodiment, a device driver determines the bounding volume from a display list created by the three-dimensional modeling application.

In some applications, the display list is reused for multiple frames and/or for multiple identical objects in a single frame. In these applications, a different coordinate transformation can be applied to the display list to reposition an object for different rendered images or to create multiple copies of an object in a frame. In an embodiment, a bounding volume is associated with the display list. Both the display list and the bounding volume are processed by the same coordinate transformation. The transformed bounding volume is then converted to a bounding area for the image. In a further embodiment, the bounding area computed for a display list is merged with any other bounding areas associated with the image, in a similar manner as described above.

Figure 4:
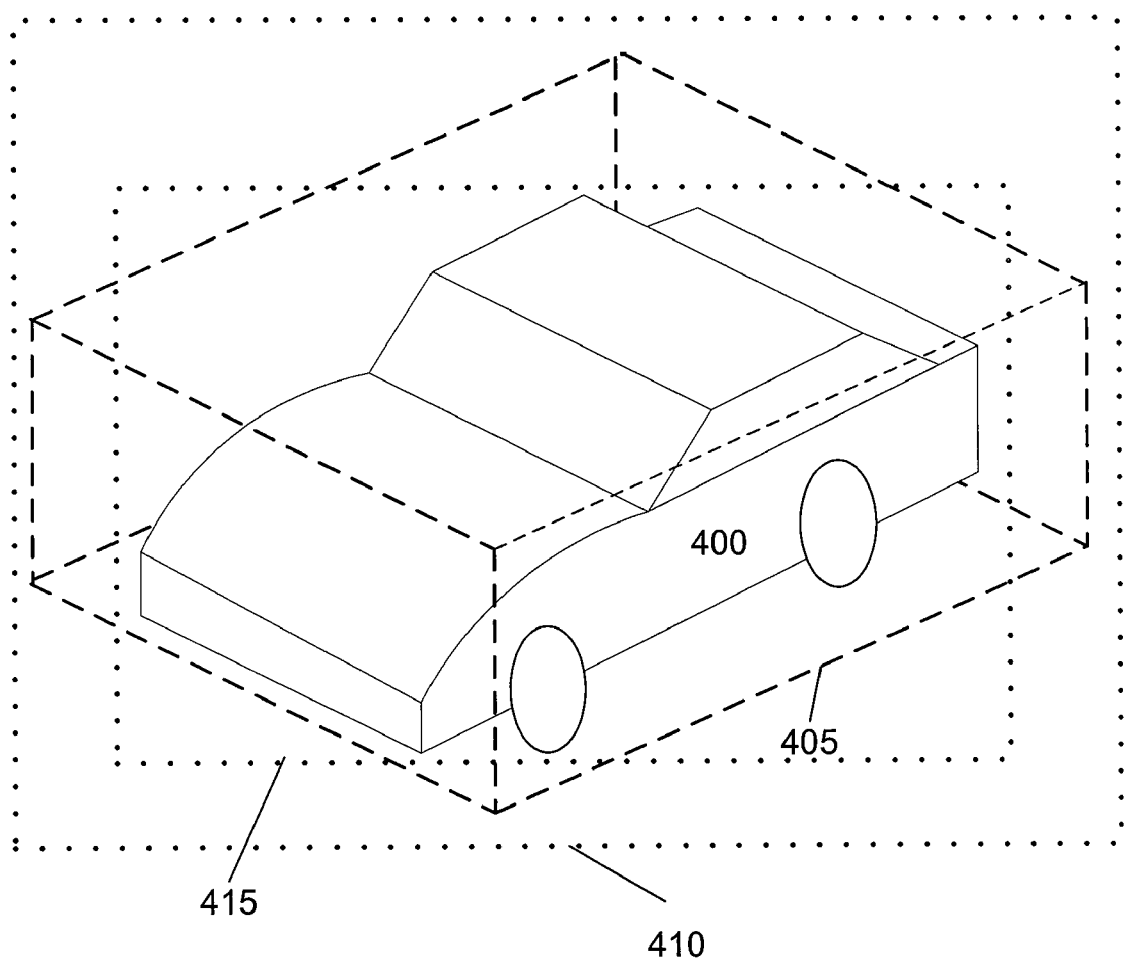
FIG. 4 illustrates a determination of a bounding area for an example 3D object used by an embodiment of the invention.

FIG. 4 illustrates a determination of a bounding area for an example three dimensional object 400 used by an embodiment of the invention. Object 400 is shown in FIG. 4 in a transformed position. Bounding volume 405, which is associated with object 400, is similarly transformed. Based upon the transformed projection of three-dimension bounding volume 405, a two-dimensional bounding area 410 can be determined. In an embodiment, the bounding area 410 is formed by creating a rectangle from the minimum and maximum x and y values of the projected bounding volume 405. Some three-dimensional modeling applications draw points and lines in larger than typical sizes to provide visual emphasis to the user. In a further embodiment, the bounding area 410 is expanded slightly from the projected extents of the bounding volume 405 in order to account for line width or point size. In another embodiment, a bounding area 415 can be determined directly from the transformed object geometry 400 as opposed to the projected bounding volume 405. As can be seen in FIG. 4, the bounding area 415 is typically much smaller than bounding area 410. In a further embodiment, discussed in more detail below, the bounding area can be determined as the object 400 is rasterized.

To render the image, step 310 writes pixel data to a display memory buffer. Additionally, step 310 may also read and/or write data to additional memory buffers, such as depth buffers, stencil buffers, and alpha buffers. Typically, these additional buffers are used to hold information needed for rendering.

Following the completion of rendering of an image, at step 315 the graphics processing subsystem displays the rendered image. At step 320, the graphics processing subsystem clears the display memory buffer and any other memory buffers used to render the image. This can be done by writing a default memory buffer values to each of the memory buffers. For example, a default or background color can be written into the display buffer to "erase" the previous image. For a depth buffer, a default depth value can be written to the depth buffer.

In an embodiment of the invention, the graphics processing subsystem only needs to clear the portion of the memory buffers corresponding to the bounding area computed during rendering. This greatly reduces the amount of time spent clearing the memory buffers. In an embodiment of step 320, the graphics processing subsystem draws a rectangle over the bounding area in each memory buffer that has the desired default memory buffer value. In an alternate embodiment of step 320, the graphics processing subsystem uses a blit engine to rapidly write the desired default memory buffer to bounding area in each memory buffer.

In a further embodiment, if there are multiple bounding areas associated with a rendered image, then step 320 is repeated for each bounding area. In yet a further embodiment, step 320 ignores the bounding area and clears the entire memory buffer in response to activity by other APIs with the display region, such as two-dimensional graphics APIs used to draw graphical user interface elements. This ensures that there will be no artifacts from previous images when rendering a new frame.

Multiple memory buffers can be used for rendering to maximize performance and ensure that animation is flicker-free. The graphics processing subsystem renders a first image into a first display buffer. As the first image is being rendered, the graphics processing subsystem displays a previously rendered image stored in a second buffer. Upon completion of rendering of the first image in the first buffer, the image in the first buffer is displayed. While the first image is being displayed, the graphics processing subsystem renders a second image. In a variation of this technique, a first buffer is used for rendering a new image, a second buffer is used to display a previously rendered image, and a third buffer holds a previously rendered image "on deck" to be displayed at the next screen refresh interval.

Figure 5A:
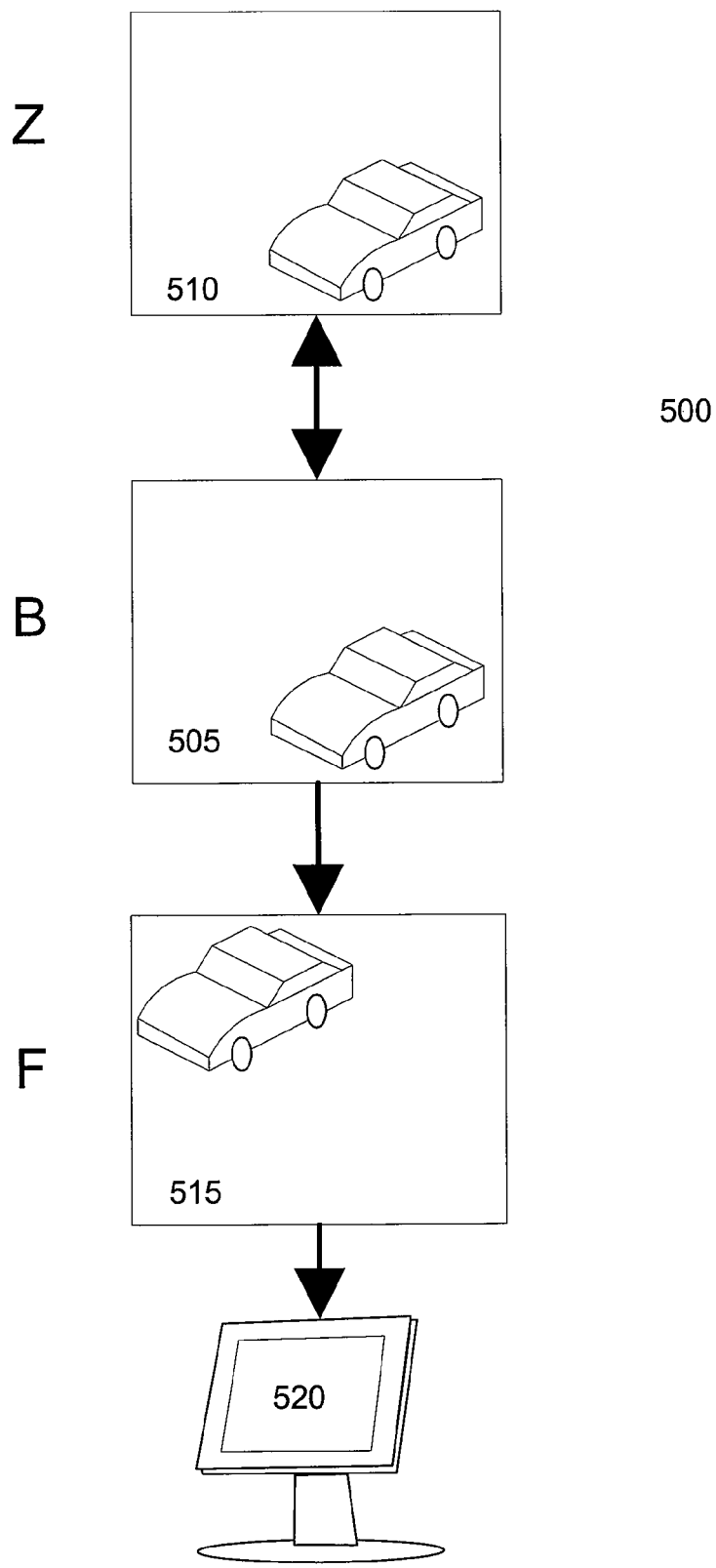
FIGS. 5A and 5B illustrate rendering methods suitable for use with an embodiment of the invention.
Figure 5B:
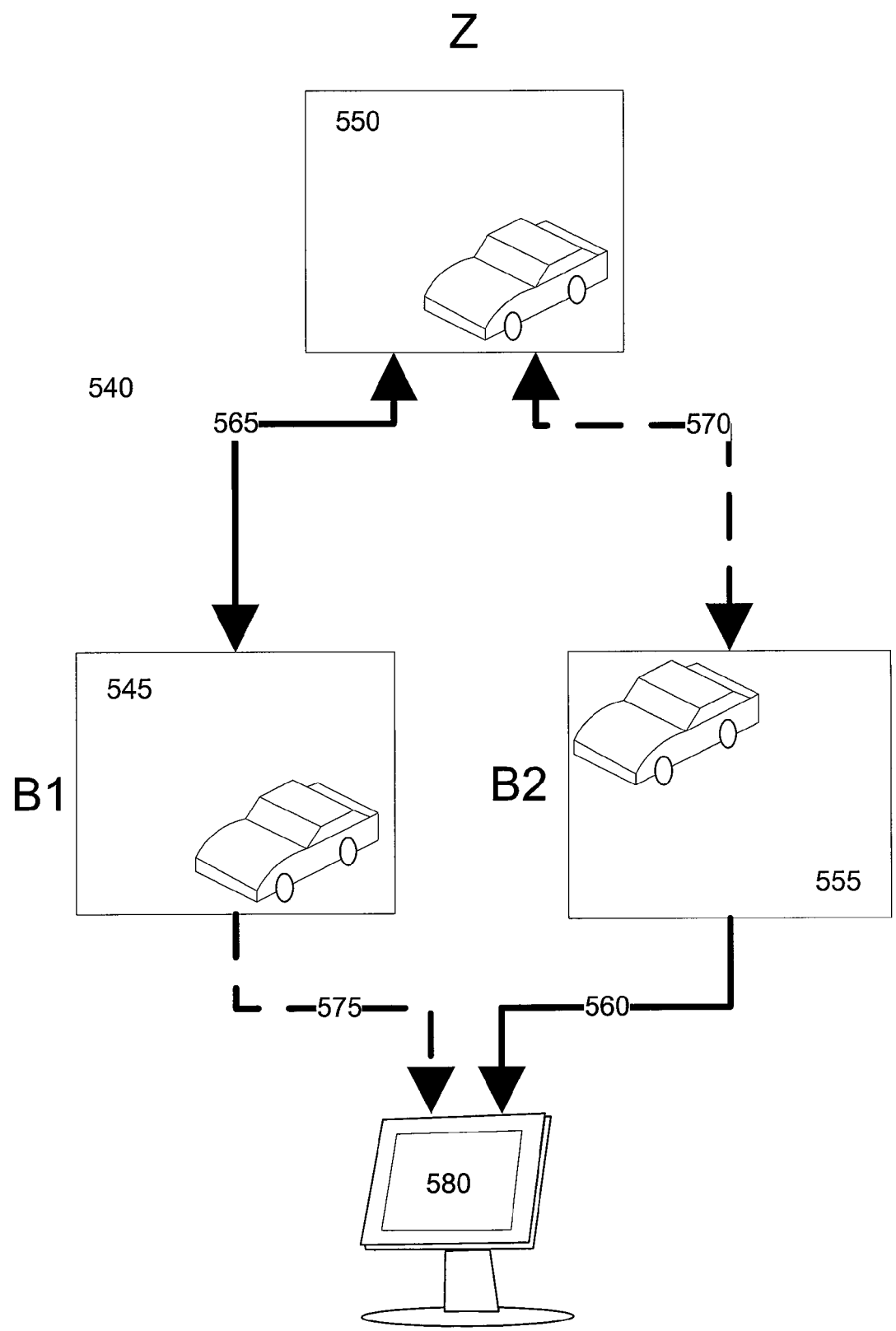

FIGS. 5A and 5B illustrate rendering systems suitable for use with an embodiment of the invention. FIG. 5A illustrates an embodiment of a graphics processing subsystem 500. The graphics processing system 500 renders a first image to a back memory buffer 505. In an embodiment, the graphics processing subsystem 500 also employs one or more supplemental memory buffers, such as depth buffer 510 during rendering. Upon completion of the rendering of the first image into back memory buffer 505, the graphics processing subsystem transfers or copies the first image from back memory buffer 505 to front memory buffer 515. In an embodiment, the graphics processing subsystem uses a blit operation to rapidly copy the first image into the front memory buffer 515.

The front memory buffer 515 is connected with the display device 520, thereby displaying the first image. While the first image is being displayed, the graphics processing subsystem 500 clears memory buffers 505 and 510 and renders the next image. In an embodiment, the graphics processing subsystem 500 clears the first image from memory buffers 505 and 510 as described in method 300 above.

In an embodiment, the front memory buffer 515 is completely cleared upon initialization of the three-dimensional modeling application. As a first rendered image is copied to the front memory buffer 515, the bounding area associated with the first image is retained for future use. Additionally, this bounding area is cleared in memory buffers 505 and 510 to prepare to render a second image. As a second image is rendered in the back memory buffer 505, a second bounding area is associated with the second image. To copy the second image from the back buffer 505 to the front buffer 515, the graphics processing system 500 only needs to copy the portion of the second image corresponding to the union of the first bounding area associated with first image and the second bounding area associated with the second image. Following the transfer of the second image to the front buffer 515, the first bounding area is discarded and the second bounding area is retained for future use in copying a third image to the front buffer 515.

FIG. 5B illustrates another embodiment of a graphics processing subsystem 540. The graphics processing system 540 renders a first image to a first display memory buffer 545. In an embodiment, the graphics processing subsystem 545 also employs one or more supplemental memory buffers, such as depth buffer 550 during rendering. Upon completion of the rendering of the first image into the first display memory buffer 545, the graphics processing subsystem 540 connects the first display memory buffer 545 with the display device 580 to display the first image. In an embodiment, the graphics processing subsystem 540 sets the value of a memory pointer associated with a display device interface, such as a digital to analog converter, to the starting memory address of the display memory buffer 545 to display the first image.

While the first image is being displayed, the graphics processing subsystem 540 clears a second display memory buffer 555 and depth buffer 550. The graphics processing subsystem 540 then renders the next image into the second display memory buffer 555. Following completion of the next image, the graphics processing subsystem connects the second display memory buffer 555 with the display device, clears memory buffers 545 and 550, and renders a third image into display memory buffer 545.

In this embodiment, the graphics processing subsystem alternately displays and renders into each of the memory buffers. As shown in FIG. 5B, the graphics processing subsystem 540 engages the connections 565 and 560 to display a first image in memory buffer 555 while rendering a second image in memory buffer 545. Next, the graphics processing subsystem 540 disengages connections 560 and 565 and engages connections 570 and 575 to display the second image in memory buffer 545 and render a third image in memory buffer 555. As supplemental memory buffers such as depth buffer 550 are typically not displayed to the user, graphics processing subsystem 540 uses the same supplemental memory buffers to assist rendering images into either of the display memory buffers 545 and 555.

In an embodiment, the graphics processing subsystem 540 clears the images from memory buffers 545, 550, and 555 as described in method 300 above. However, in this embodiment, the image in the supplemental memory buffer is from the previous frame, while the image in the display memory buffer is from the penultimate frame. Because objects can, and typically do, change position from frame to frame, the graphics processing subsystem 540 must keep track of the bounding areas from the previous two frames. The bounding area of the previous frame is used to clear the supplemental memory buffers. The bounding area of the penultimate frame is used to clear the display memory buffer.

Figure 6A:
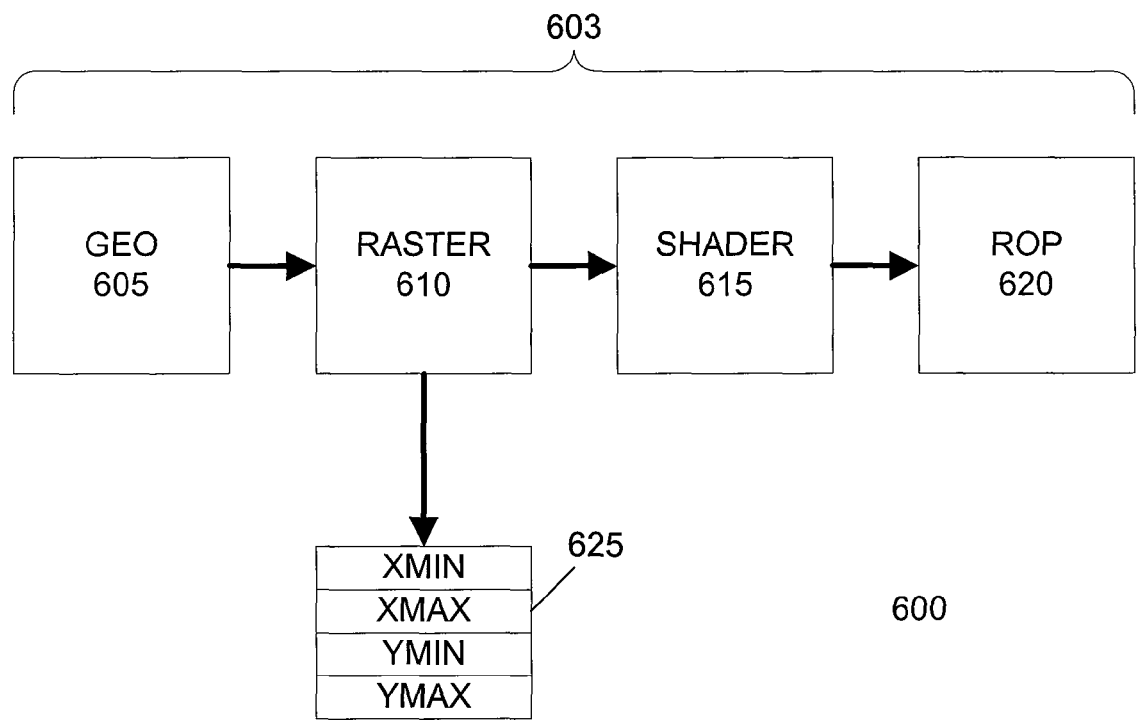
FIGS. 6A and 6B illustrate graphics processing subsystems according to embodiments of the invention.
Figure 6B:
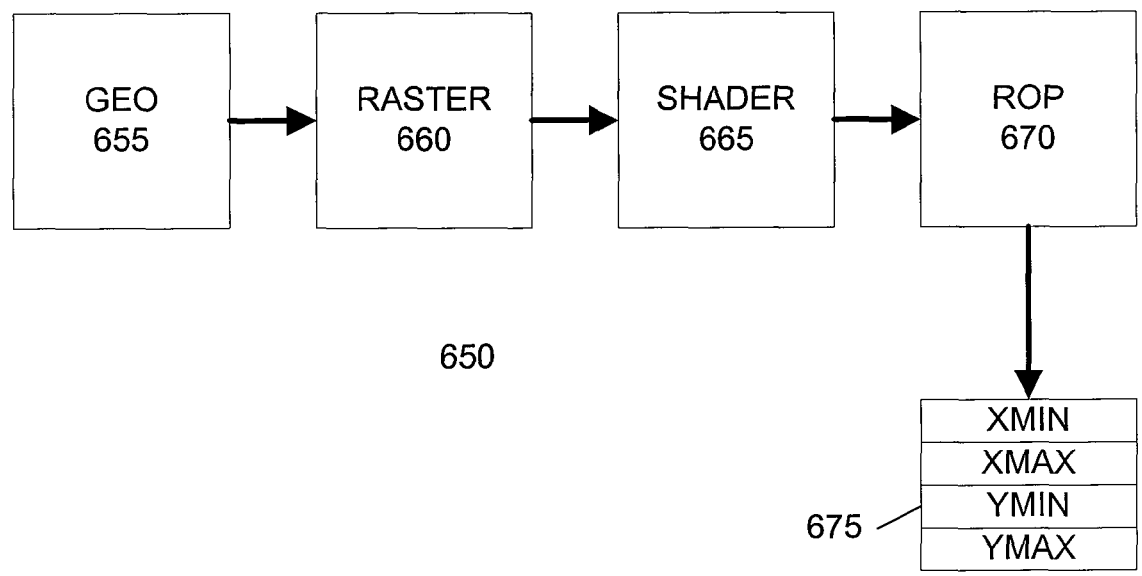

FIGS. 6A and 6B illustrate graphics processing subsystems according to embodiments of the invention. FIG. 6A illustrates an embodiment of a graphics processing subsystem 600 adapted to determine a bounding area as geometric primitives are rendered. Graphics processing subsystem 600 includes a graphics pipeline 603 to process rendering commands and output pixel data for a rendered image. The graphics pipeline 603 includes a number of different processing stages. Geometry stage 605 applies one or more coordinate transformations to a geometric primitive to produce transformed geometric primitives. The rasterizer stage 610 converts the transformed geometric primitives into a set of pixels. Shader stage 615 performs lighting, texturing, shading, and other calculations in order to determine the color values of the set of pixels. The raster operation stage 620 performs masking, depth testing, and blending operations to combine the set of pixels with the pixel data already created for the rendered engine.

In graphics subsystem 600, the rasterizer stage 610 determines the bounding area as each geometric primitive is processed. In an embodiment, a bounding region of each geometric primitive is a rectangular region. The bounding region of each geometric primitive is then compared with the bounding area of the rendered image stored in bounding area memory 625. In an embodiment, the bounding area memory is a register storing minimum and maximum x and y coordinates of the bounding area. In a further embodiment, the graphics processing subsystem 600 stores a copy of the bounding area memory 625 in additional memory, such as additional memory 145 shown in FIG. 1, to facilitate access by the device driver.

If the bounding rectangle of the primitive falls outside of the bounding area, the bounding area is updated to include the bounding rectangle of the primitive. In an embodiment, the bounding area is updated by setting the minimum x and y values in bounding area memory to the minimum of the minimum x and y values of the bounding region of the geometric primitive and the previous minimum x and y values of the bounding area memory 625. Similarly, the maximum x and y values in the bounding area memory 625 are set to the maximum of the maximum x and y values of the bounding region of the geometric primitive and the previous maximum x and y values of the bounding area memory 625.

The updated bounding area is then stored in bounding area memory 625. This comparison is repeated during the rendering of each geometric primitive. Once all of the geometric primitives in a frame have been processed by rasterizer stage 610, the bounding area memory 625 will contain the bounding area for the final rendered image. The memory buffers can then be cleared using the values of the bounding area memory 625. In a further embodiment, the values of the bounding area memory 625 are saved to be used in clearing a future frame, such as when using the graphics processing subsystem 540 in FIG. 5B discussed above. Additionally, the rasterizer stage 610 can clear the values of the bounding area memory 625 prior to processing a new frame.

FIG. 6B illustrates an embodiment of a graphics processing subsystem 650 adapted to determine a bounding area as geometric primitives are rendered. Like graphics processing subsystem 600, graphics processing subsystem 650 includes a geometry stage 655, a rasterizer stage 660, a shader stage 665, and a raster operation stage 670. In this embodiment, bounding area memory 675 is connected with the raster operation stage 670 rather than the rasterizer stage 600, as discussed above. The raster operation stage 670 can potentially discard some or all of the pixel set generated by the rasterizer 660 as a result of depth testing, stencil, or masking operations.

Because of this, the bounding area of the pixels output by the raster operation stage 670 may in some cases be smaller than the bounding area of the pixel set generated by the rasterizer stage 660. Therefore, the performance of clear operations using the bounding area from the pixels output from the raster operation stage 670 will be often be better than when using the bounding area from the pixel set generated by the rasterizer stage 660.

The raster operation stage 670 determines the bounding area in a similar manner to the rasterizer discussed in FIG. 6A. The raster operation stage 670 determines a bounding region for the set of pixels associated with each geometric primitive as it is processed by the graphics processing subsystem 650. The raster operation stage processes the set of pixels associated with a geometric primitive and may discard some pixels as a result of depth testing, stencil, masking, or other operations. The minimum and maximum x and y values of the remaining pixel set are then compared with the bounding area of the rendered image stored in bounding area memory 675. If the extents of the remaining pixel set fall outside of the bounding area stored in bounding area memory 675, the bounding area is expanded to include the remaining pixel set.

The updated bounding area is then stored in bounding area memory 675. This comparison is repeated during the rendering of each geometric primitive. Once all of the geometric primitives in a frame have been processed by raster operation stage 670, the bounding area memory 675 will contain the bounding area for the final rendered image. The memory buffers can then be cleared using the values of the bounding area memory 675. In a further embodiment, the values of the bounding area memory 675 are saved to be used in clearing a future frame, such as when using the graphics processing subsystem 540 in FIG. 5B discussed above. Additionally, the raster operation stage 670 can clear the values of the bounding area memory 675 prior to processing a new frame.

In an embodiment of method 300 discussed above, the bounding area for a frame is computed as the geometry is being rendered. Upon completion of the computation of the bounding area, the bounding area is used almost immediately to clear one or more memory buffers. In one implementation of method 300, a device driver reads the bounding area values from the bounding area memory, or from a copy of the bounding area memory stored in additional memory, and then sends a clear command to the graphics processing subsystem. In an embodiment, the clear command specifies the bounding area to be cleared, for example by including the minimum and maximum x and y coordinates of the bounding area. This type of clear instruction is referred to as a direct clear instruction. The device driver must quickly read the bounding area from the graphics processing subsystem and issue a clear command. Otherwise, the graphics processing subsystem will be idle waiting for the device driver.

A further embodiment of the invention avoids the possibility of idling the graphics processing subsystem by employing a different type of clear instruction. In this embodiment, a clear instruction directs the graphics processing subsystem to clear an area specified by the values stored in the bounding area memory. The device driver can send this instruction, referred to as an indirect clear instruction, to the graphics processing subsystem without knowing the values specifying the bounding area. To execute this instruction, the graphics processing subsystem accesses the bounding area memory to determine the bounding area and performs a clear operation in the appropriate memory buffer over the bounding area. In an embodiment, this clear instruction can be stored in a command buffer well in advance of its execution by the graphics processing subsystem. In this embodiment, the graphics processing subsystem retrieves and executes instructions from the command buffer in the order they were written by the device driver.

Figure 7:
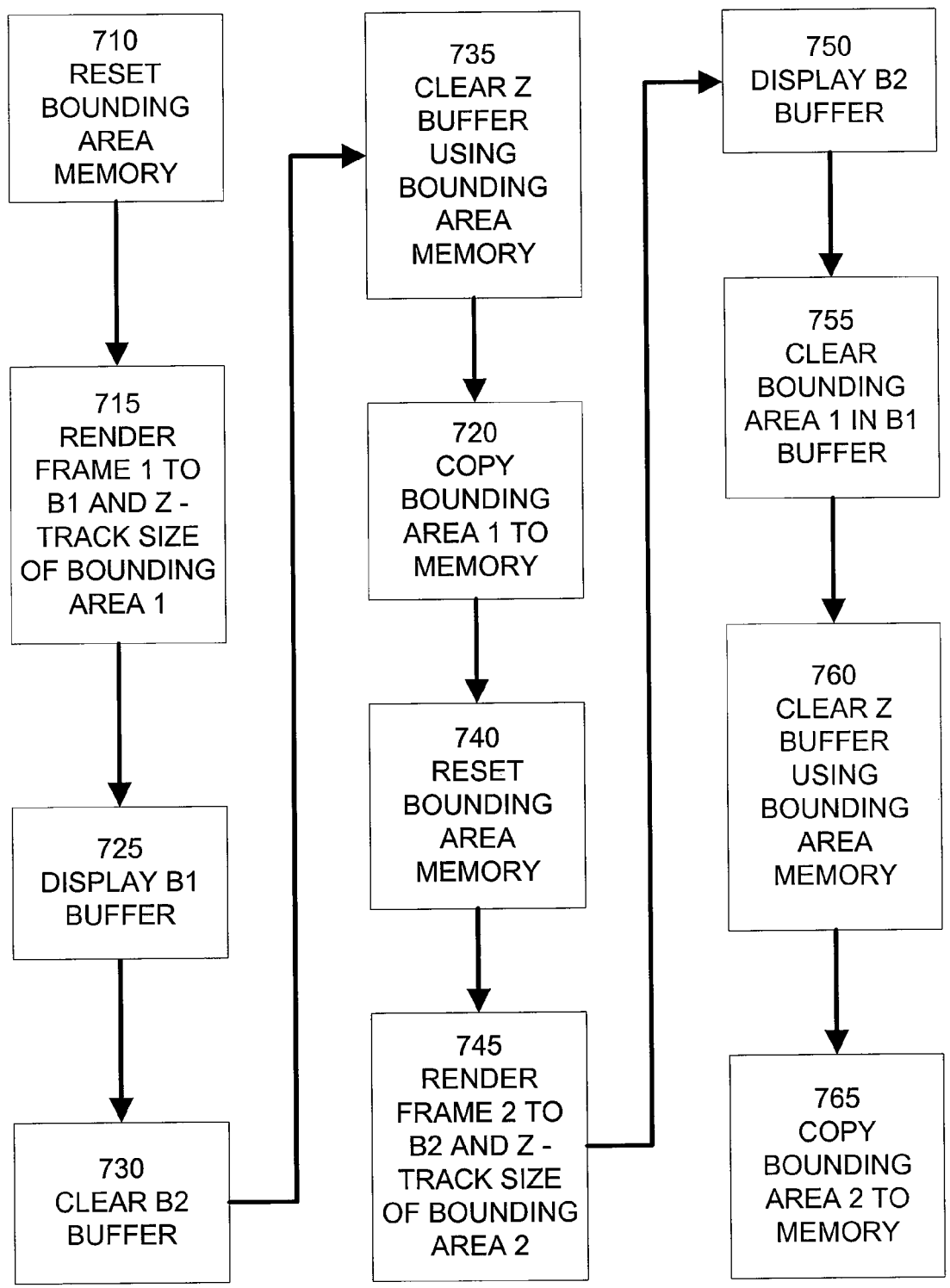
FIG. 7 illustrates a rendering method suitable for use with an embodiment of the invention.

In yet a further embodiment, both types of clear instructions can be combined to efficiently clear all of the memory buffers in a rendering system such as that described with reference to FIG. 5B. FIG. 7 illustrates an embodiment of a method suitable for use with this type of rendering system. At step 710, the bounding area memory defining the bounding area of a frame is cleared to a default value. In an embodiment, the minimum extents of the bounding area are set to a default maximum value and the maximum extents of the bounding area are set to a default minimum value, so that the comparison test as described above is performed correctly for the first geometric primitive processed by the graphics processing subsystem.

At step 715, a first frame is rendered to a first memory buffer, using the supplemental memory buffers as needed. As the geometric primitives of the first frame are rendered, the graphics processing subsystem determines the values of a first bounding area. The values of the first bounding area are stored in the bounding area memory of the graphics processing subsystem.

At step 725, the first memory buffer is connected with the display device, so that the first frame is displayed. While the contents of the first memory buffer is being displayed, the graphics processing subsystem begins the rendering of a second frame. In order to render the second frame, at step 730 a second memory buffer is cleared. During the rendering of the second frame, the entire second memory buffer must be cleared, rather than a small portion associated with a bounding area. However, as discussed below, during subsequent iterations of this method, step 730 only needs to clear a bounding area associated with the second memory buffer.

At step 735, any supplemental memory buffers used to render the first frame, such as a depth buffer, are cleared so they can be reused to render a second frame. The supplemental buffers are cleared using the bounding area values stored in the bounding area memory. In an embodiment, the device driver clears the supplemental memory buffers using an indirect clear command. As described above, the indirect clear command can be issued by the device driver well in advance of its execution by the graphics processing subsystem. This ensures that the graphics processing subsystem is not delayed following the completion of rendering in step 715 to wait for the device driver to read the bounding area memory.

At step 720 the values of the first bounding area are copied to memory for future use, as discussed below. Following step 720, step 740 resets the values of the bounding area memory, similar to step 710 discussed above.

Once the second and supplemental memory buffers have been cleared, step 745 renders the second frame to the second memory buffer, using the supplemental memory buffers as needed. As the geometric primitives of the second frame are rendered, the graphics processing subsystem determines the values of a second bounding area. The values of the second bounding area are stored in the bounding area memory of the graphics processing subsystem.

At step 750, the second memory buffer is connected with the display device, so that the second frame is displayed. While the contents of the second memory buffer are being displayed, the graphics processing subsystem begins the rendering of a third frame. The third frame can be rendered into the now unused first memory buffer. In order to render into the first memory buffer, the first memory buffer must be cleared of the first frame and the supplemental buffers must be cleared of the second frame. At step 755, the first memory buffer is cleared using the first bounding area values previously copied at step 720. In an embodiment, the device driver issues a direct clear instruction including the values of the first bounding area to the graphics processing subsystem. Because of the substantial amount of time typically required to complete steps 725 through 750, the device driver has sufficient time to read the first bounding area values and to issue a direct clear instruction.

At step 760, the supplemental memory buffers used to render the second frame are cleared so they can be reused to render a third frame. The supplemental buffers are cleared using the second bounding area values stored in the bounding area memory. In an embodiment, the device driver clears the supplemental memory buffers using an indirect clear command.

At step 765, the second bounding area values are copied from the bounding area memory to memory for future use in clearing the second memory buffer, similar to step 720 discussed above.

Following completion of step 765, the graphics processing subsystem is ready to render a third frame. For the third and subsequent frames, the method 700 can be repeated beginning with step 710. In this embodiment, all odd numbered frames will be rendered to the first memory buffer and all even numbered frames will be rendered to the second memory buffer. Additionally, step 730, which initially required the entire second buffer to be cleared, can be modified during subsequent executions of method 700 to clear only the bounding area associated with the second memory buffer. The bounding area associated with the second memory buffer is copied to memory in step 765. In an embodiment, the device driver issues a direct clear instruction including the values of the second bounding area to the graphics processing subsystem, similar to step 755.

This invention provides a very efficient way to clear memory buffers used to create rendered images by only clearing the portion of the memory buffer changed by a previous frame. Although the invention has been discussed with respect to specific examples and embodiments thereof, these are merely illustrative, and not restrictive, of the invention. For example, the invention can be used by a graphics processing subsystem with three or more display memory buffers, rather than merely two display memory buffers as discussed above. Additionally, although the use of bounding areas is discussed with reference to rendering geometric primitives, the invention can be applied to any output of the graphics processing subsystem, such as bitmaps, which are typically used to create text labels on parts of a model rendered by a three-dimensional modeling application.

A further embodiment of the invention performs other types of graphics operations, instead of clears, using the bounding area. For example, accumulation operations, which blend pixels from several images into a supplemental display memory buffer, can be performed faster when the clear color is black by only accumulating pixels within the bounding area of an image to the supplemental display memory buffer. In another example, blit operations that copy pixels from a source image to a destination image only need to copy pixels from the area clipped by the bounding area of the source image. This example can be applied when the source and destination images do not overlap, and the destination image area does not intersect the bounding area. Thus, the scope of the invention is to be determined solely by the claims.

What is claimed is:

1. A method for creating a sequence of rendered images, comprising:
   resetting a first set of values defining a first bounding area memory connected with a graphics pipeline;
   creating a first rendered image in a first memory buffer from a first set of rendering commands defining a first set of primitives;
   modifying the first set of values defining the first bounding area memory in response to the first set of rendering commands;
   displaying the first rendered image from the first memory buffer;
   storing the first set of values defining the first bounding area memory as a first bounding area value in a memory;
   resetting a second set of values defining a second bounding area memory connected with the graphics pipeline in preparation for a second rendered image;
   creating the second rendered image in a second memory buffer from a second set of rendering commands defining a second set of primitives;
   modifying the second set of values defining the second bounding area memory in response to the second set of rendering commands;
   displaying the second rendered image from the second memory buffer; and
   clearing a portion of the first memory buffer corresponding to the first bounding area value.

2. The method of claim 1, wherein creating the first rendered image comprises:
   using a supplemental memory buffer to create the first rendered image; and
   prior to the resetting a second set of values defining a second bounding area memory connected with the graphics pipeline in preparation for a second rendered image, clearing a portion of the supplemental memory buffer corresponding to the first set of values defining the first bounding area memory.

3. The method of claim 2, wherein the supplemental memory buffer is a depth buffer.

4. The method of claim 2, wherein clearing a portion of the supplemental memory buffer is in response to a clear command referencing the first bounding area memory.

5. The method of claim 4, wherein the clear command includes the first bounding area value.

6. The method of claim 2, wherein creating the second rendered image comprises:
   using a supplemental memory buffer to create the second rendered image; and
   following the displaying the second rendered image from the second memory buffer, clearing a portion of the supplemental memory buffer corresponding to the second set of values defining the second bounding area memory.

7. The method of claim 1, wherein clearing a portion of the first memory buffer corresponding to the first bounding area value is in response to a clear command.

8. The method of claim 1, further comprising:
   storing the second set of values defining the second bounding area memory as a second bounding area value in a memory;
   resetting the first set of values defining the first bounding area memory connected with the graphics pipeline in preparation for a third rendered image;
   creating the third rendered image in the first memory buffer from a third set of rendering commands defining a third set of primitives;
   modifying the first set of values defining the first bounding area memory in response to the third set of rendering commands;

displaying the third rendered image from the first memory buffer; and clearing a portion of the second memory buffer corresponding to the second bounding area value.

9. The method of claim 8, wherein clearing a portion of the second memory buffer corresponding to the second bounding area value is in response to a clear command including the second bounding area value.

10. The method of claim 1, wherein the first bounding area memory includes a connection with a rasterizer stage of the graphics pipeline, such that the first set of bounding area values are determined from a set of pixels output by the rasterizer stage.

11. The method of claim 1, wherein the first bounding area memory includes a connection with a raster operation stage of the graphics pipeline, such that the first set of bounding area values are determined from a set of pixels output by the raster operation stage.

12. A graphics processing subsystem comprising:
a graphics pipeline;
a first register coupled to the graphics pipeline to store a first set of values defining a first bounding area memory;
a first memory buffer coupled to the graphics processor to store a first rendered image using a first set of primitives and to provide the first rendered image to a display;
a second register coupled to the graphics pipeline to store a second set of values defining a second bounding area memory; and
a second memory buffer coupled to the graphics processor to store a second rendered image using a second set of primitives and to provide the second rendered image to the display,
wherein the first set of values are used to clear a portion of the first buffer memory corresponding to the first bounding area memory after the first rendered image is provided to a display.

13. The graphics processing subsystem of claim 12 wherein the graphics pipeline resets the first set of values before the first image is rendered and the second set of second set of values before the second image is rendered.

14. The graphics processing subsystem of claim 13 wherein after the first image is rendered, the first set of values are stored in a memory.

15. A graphics processor comprising:
a graphics pipeline;
a first register coupled to the graphics pipeline to store a first set of values defining a first bounding area memory; and
a second register coupled to the graphics pipeline to store a second set of values defining a second bounding area memory;
wherein the graphics pipeline renders a first image using a first set of primitives and stores the first rendered image in a first memory buffer, and the graphics pipeline renders a second image using a second set of primitives and stores the second rendered image in a second memory buffer,
wherein the first set of values are used to clear a portion of the first buffer memory corresponding to the first bounding area memory after the first rendered image is provided to a display.

16. The graphics processor of claim 15 wherein the second set of values are used to clear a portion of the second buffer memory corresponding to the second bounding area memory after the second rendered image is provided to a display.

17. The graphics processor of claim 15 wherein the graphics pipeline resets the first set of values before the first image is rendered and the second set of second set of values before the second image is rendered.

18. The graphics processor of claim 17 wherein after the first image is rendered, the first set of values are stored in a memory.

* * * * *